United States Patent [19]

Blair et al.

[11] Patent Number: 4,653,976
[45] Date of Patent: Mar. 31, 1987

[54] METHOD OF COMPRESSING A FLUID FLOW IN A MULTI STAGE CENTRIFUGAL IMPELLER

[75] Inventors: Lawrence W. Blair, Boxford; Alexander C. Bryans, Reading, both of Mass.

[73] Assignee: General Electric Company, Lynn, Mass.

[21] Appl. No.: 661,009

[22] Filed: Oct. 15, 1984

Related U.S. Application Data

[62] Division of Ser. No. 429,735, Sep. 30, 1982, Pat. No. 4,502,837.

[51] Int. Cl.⁴ .............................................. F01D 1/02
[52] U.S. Cl. .................................... 415/1; 415/198.1; 415/199.6; 416/183
[58] Field of Search ................. 415/1, 198.1, 199.6, 415/143; 416/183

[56] References Cited

U.S. PATENT DOCUMENTS

4,167,369  9/1979  Ishihara ............................ 416/183
4,502,837  3/1985  Blair et al. ...................... 415/198.1

Primary Examiner—Robert E. Garrett
Assistant Examiner—John Kwon
Attorney, Agent, or Firm—Francis L. Conte; Derek P. Lawrence

[57] ABSTRACT

A multistage centrifugal impeller in which each blade row is individually matched to optimum efficiency characteristics in a manner which minimizes blade lean. Each blade row is composed of twisted blades which substantially equalize working fluid diffusion from blade root to blade tip while restraining blade lean to less than 15°.

17 Claims, 12 Drawing Figures

METHOD OF COMPRESSING A FLUID FLOW IN A MULTI STAGE CENTRIFUGAL IMPELLER

This application is a division of application Ser. No. 429,735, filed Sept. 30, 1982, now U.S. Pat. No. 4,502,837.

BACKGROUND

This invention relates to centrifugal impellers and, in particular, concerns centrifugal impellers used as final compressor stages in aircraft gas turbine engines.

Gas turbine engines have become the standard propulsion source for all types of aircraft but the very smallest. The aircraft gas turbine engine operates as an open Brayton cycle system whose work output is either in the form of a high energy exhaust or a mechanical shaft rotation. In gas turbine engines that produce a high energy exhaust steam, turbofan or turbojet engines, the compressors are generally of the axial type. Axial compressors are made up of a series of rotating stages of axial blades which compress inlet air prior to combustion. In gas turbine engines of the rotating shaft type, turboshaft or turboprop engines, axial-centrifugal compressors have been found to be more suited in many applications. The axial-centrifugal compressors have a series of axial stages similar to pure axial compressors prior to a final centrifugal stage situated just upstream of a gas diffuser and a combustor. The centrifugal stage provides a high level of compression in a minimum of length.

The centrifugal impellers used in the axial-centrifugal compressors have been found lacking in several respects in comparison with axial stages.

In recent years the centrifugal impellers devised have not been able to achieve the efficiency of axial stages. This shortcoming in efficiency has limited centrifugal impeller use in turbojet engines and hindered axial-centrifugal compressor efficiency in turboshaft type engines.

SUMMARY OF THE INVENTION

The invention comprises a method of compressing a fluid flow and transforming the fluid flow from an axial to a centrifugal flow in a centrifugal compressor, which includes the steps of:

(a) compressing the fluid in an optimized axial manner at a first blade row, and (b) further compressing the fluid in an exit blade row with an optimized centrifugal exit, (c) the fluid flow being diffused at a substantially equalized rate along blade height as the fluid proceeds from the first blade row and through the exit blade row.

The invention may be practiced by utilizing a multi-stage centrifugal compressor in which there is an annular flow path substantially parallel to the axis of rotation at the inlet and substantially perpendicular to the axis of rotatioon at the outlet. The outer surface of the flow path is determined by a stationary shroud, while the inner surface is formed by a rotating impeller hub. The impeller comprises at least two rows of blades positioned upon the hub. Preferably, the blade rows have different numbers of rotating blades.

In the first blade row or inducer, at the inlet of the centrifugal compressor, each blade is made to match different substantially optimum air stream lines from the root to the tip of the blade. This allows for a generally constant pressure flow at the exit of the blade row.

The inlet blade row may be designed for fluid supersonic Mach numbers, consistent with temperature corrected impeller tip speeds in excess of 1,200 ft/sec.

There is also a second blade row comprising a transitional stage, in which a plurality of blades are axially spaced from the first blade row. In the second blade row, each blade is also made to match substantially different airstream lines at the root and the tip of the blade so as to allow a generally constant pressure flow at the exit of the blade row.

In a preferred embodiment a third stage, or exducer, is separated from the second stage of the impeller. The third stage is optimized according to the flow characteristics of the impeller exit. The exducer blades have little or no rake relative to the impeller hub at the airflow exit.

In the preferred embodiments, the blade rows stage are comprised of a plurality of blades, each blade having a profile incorporating lean, which substantially equalizes the diffusion of the fluid at the blade root and the blade tip. Blade row axial length is sufficiently short in each stage to minimize blade tip lean. Blade lean is thus restricted to less than 12°–15° at any place along any of the rows of blades.

A characteristic of the preferred embodiments is that the blade rows are axially displaced from each other in order to optimize flow according to optimized blade angles for each flow region of the impeller. It is further noted that a substantially constant rate of diffusion of the fluid being compressed is maintained throughout the centrifugal compressor by variation in blade number, or solidity, in the rotating blade rows.

A further characteristic of the preferred embodiment is that there are no stationary blade rows situated between the rotating blade rows. Furthermore, the centrifugal impeller is an integral unit that all blade rows rotate together, at the same speed and do not change in relative position from each other. It should be noted, however, that the impeller may be assembled from separate pieces.

DETAILED DESCRIPTION OF THE INVENTION

Figure 1:
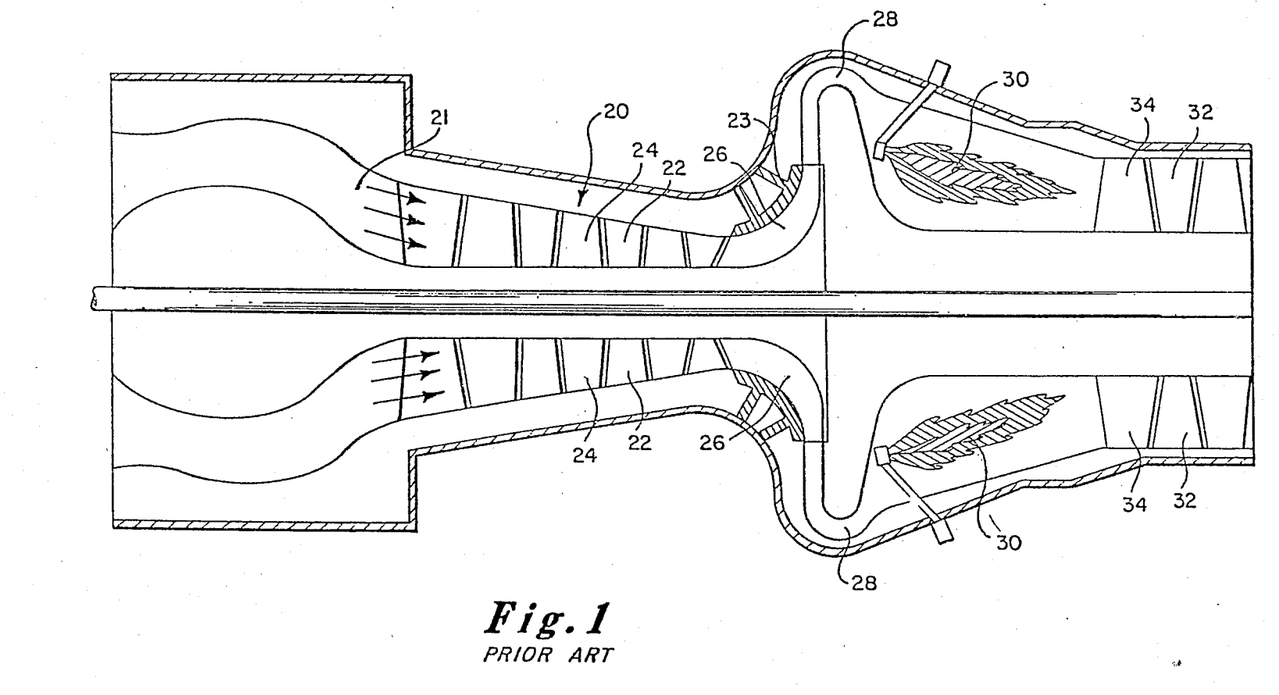
FIG. 1 is a cross section of a conventional gas turbine engine. It is marked "Prior Art."

FIG. 1 shows the gas flow path through the central part of a gas turbine engine with a conventional axial-centrifugal compressor 20. Air from the inlet 21 travels through a series of axial stages of rotating blades 24 and static stators 22. These rotating axial stages drive the air forward and thereby compress the air in an efficient manner. After the air passes through the axial section of the compressor 20, the centrifugal impeller 26 drives the air outward and further compresses the air prior to its entry into the diffuser 28 and the combustion area 30. At the centrifugal impeller 26, the air volume is contained by the impeller itself and the impeller shroud 23. The compressed air is heated in the combustion area and travels through the turbine nozzle 32 and the rotating turbine rotor 34 where work is recovered from the high temperature highly compressed gas.

Figure 2:
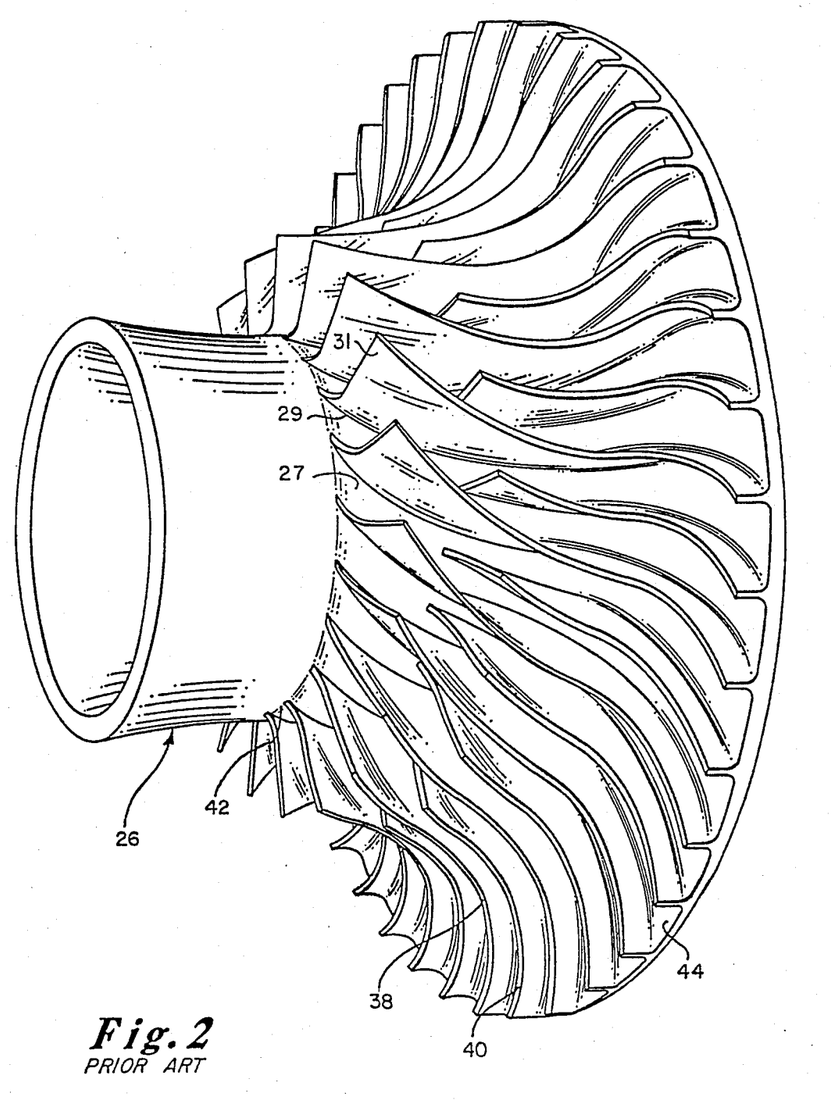
FIG. 2 is a perspective view of a conventional centrifugal impeller. It is marked "Prior Art."

FIG. 2 is a perspective drawing of a conventional centrifugal impeller 26 as shown in cross-section drawing FIG. 1. Rotating integral blades 38 can be described as twisted sheets designed to compress air in a centrifugal gravitational field. Splitter blades 40, which are partial versions of the larger continuous blades 38, prevent excessive diffusion of gas flow as the air channels increase in size with the increasing impeller circumference from the air inlet 42 to the exit 44. It should be noted that modern impellers are generally machined in one piece.

Air enters the centrifugal impeller 26 in the axial inlet area 42. The air entering at the inlet has been compressed by the axial compressor stages upstream of the centrifugal impeller. The air, at the inlet, is therefore moving in a direction parallel to the axis of rotation and is already highly compressed. The inner flow path of the air in the impeller is formed by the impeller hub 27. The air itself is driven forward and compressed by the impeller blades 38 in all areas of the blade from blade root 29 to blade tip 31. As the air proceeds through the centrifugal impeller, the flow direction changes from parallel to the axis of rotation to perpendicular to it in all directions. The air, by the time it reaches the exit 44, is moving primarily outwardly from the axis of rotation and no longer moving along that axis. The flow field at that point may be described as a centrifugal flow field, in that the primary direction of the air at the centrifugal impeller exit 44 is tangential. Impellers of the conventional type as here shown have several restrictions placed upon them which limit their efficiency. These will be more graphically described below, but reference to FIG. 2 is encouraged.

Figure 3:
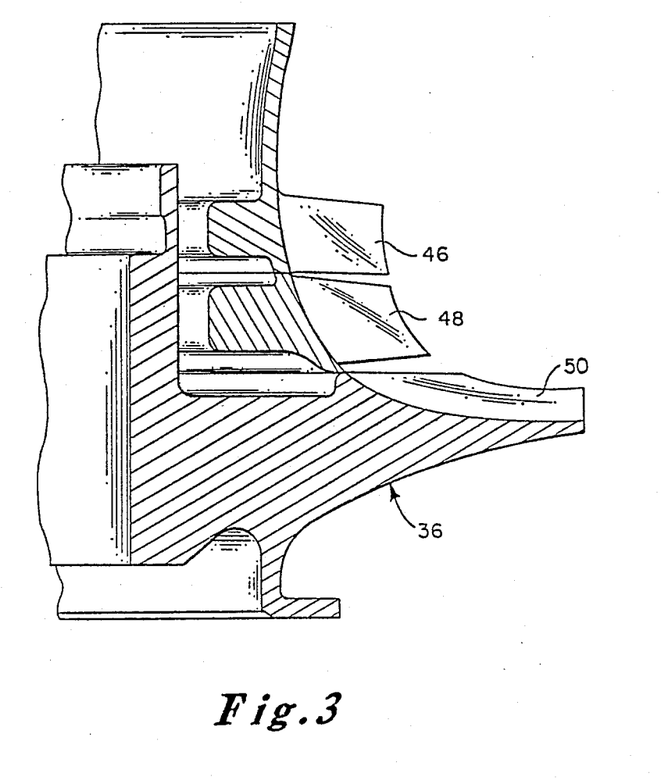
FIG. 3 is a cross section of a centrifugal impeller incorporating this invention.

FIG. 3 is a cross section of a centrifugal impeller 36 incorporating this invention which may be installed in the compressor of FIG. 1 in place of the conventional impeller 26. As in the compressor of FIG. 1, air enters at the compressor inlet 21 and passes through a series of rotating axial blade stages 24 and non-rotating stators 22. The centrifugal impeller 36, however, is divided into three novel flow regions which will be more particularly described below. Upon passing through the rotating centrifugal impeller, the air travels through a diffuser 28, a combustion section 30, a turbine nozzle 32, and a turbine rotor 34. Work is taken from the high temperature highly compressed gas by the turbine as in a conventional compressor. An advantage of the invention is the ability of the novel impeller 36 to be substituted in the compressor 20 for a conventional impeller 26 without the additional cost of engine redesign.

Figure 4:
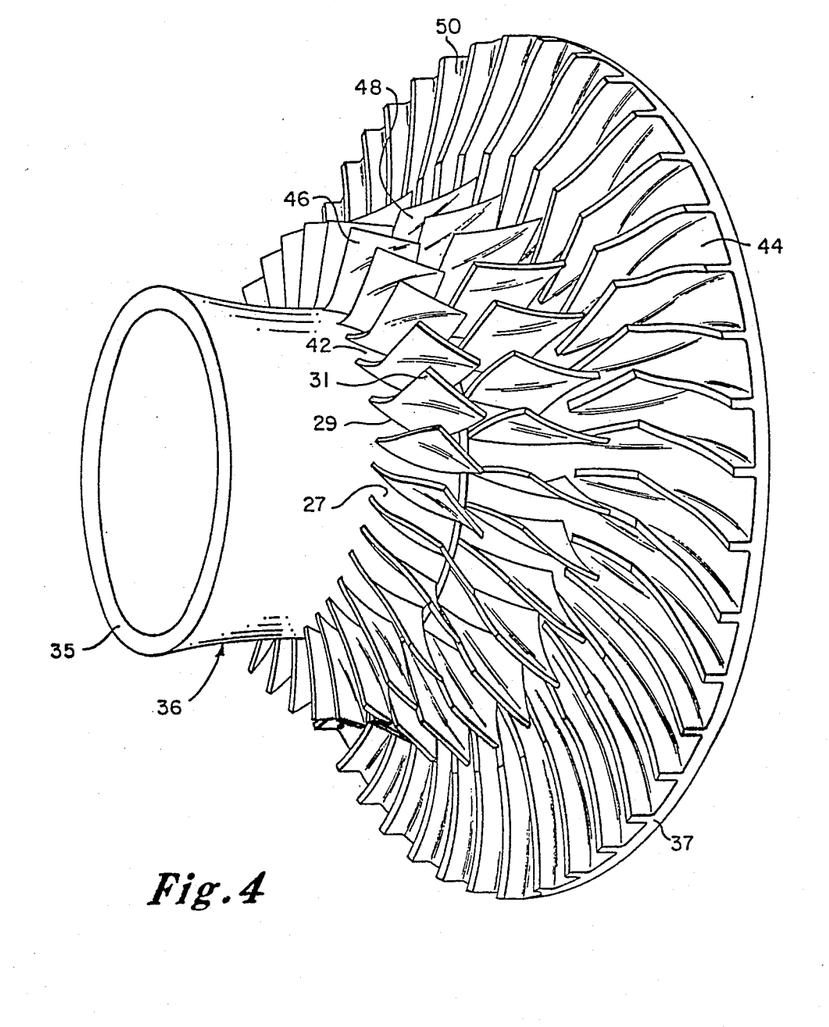
FIG. 4 is a perspective view of a centrifugal impeller incorporating this invention.

FIG. 4 shows a perspective view of the centrifugal impeller of FIG. 3 embodying this invention. This centrifugal impeller 36 is made up of three blade rows 46, 48, and 50. The air enters through inlet 42 and exits through exit 44.

The creation of the three individual flow regions allows for optimization of centrifugal flow characteristics for efficient flow. The first region is an independent blade row 46 called the inducer having mostly axial characteristics. The second blade row 48 is a transitional or mixed flow region which has progressively less axial and more centrifugal characteristics as the radius of the impeller hub 27 expands. The hub 27 is defined as the impeller surface at the roots 29 of the blades. Flow region 50 is a primarily rotating radial flow region, or exducer, in which the air flow is directed primarily outward from the axis of rotation rather than along the axis of rotation as it is in an axial row.

The significance and benefits of the design may not be intuitively apparent from this drawing. They will be understood, however, after discussion of the basis of the design parameters below. By dividing up the centrifugal impeller into three regions of differing blade numbers, a maximum possible efficiency is reached, and the efficiency greatly elevated above that possible in the conventional centrifugal impellers.

Compressors are designed to produce a specific pressure ratio from air inlet to air exit. In turbine engine final stages where centrifual impellers are used, it is most efficient to force the airflow to diffuse at a generally constant rate. This means that the flow speed decreases and air pressure increases at a generally constant rate from blade inlet to exit. If the diffusion rate is to high, the impeller will not pump efficiently and air flow will separate near the hub resulting in increased losses.

Figure 5:
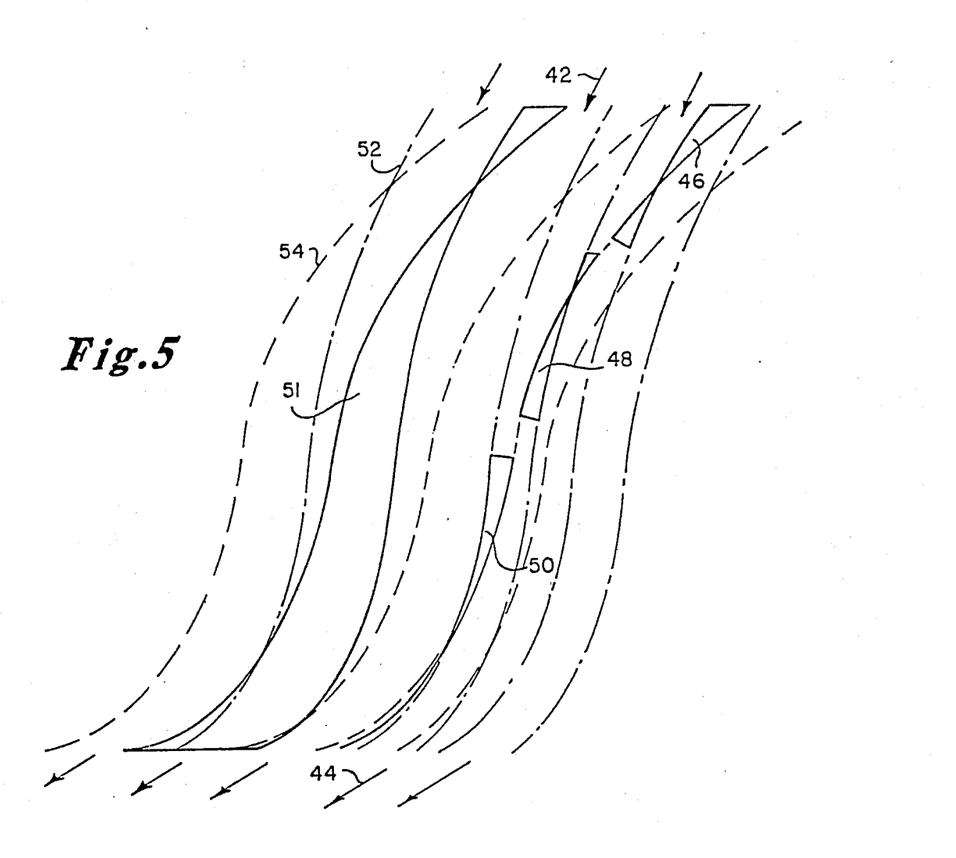
FIG. 5 is a representation of the aerodynamic stream lines of the gas flow on a centrifugal impeller.

FIG. 5 is a representation of aerodynamic streamlines of optimum air flow patterns within the flow volume of a centrifugal compressor. The air flow patterns have been circumferentially unwrapped and simplified as an aid for clarity of understanding. This view should be considered as a two dimensional representation of a three dimensional flow. The streamlines have been optimized for a particular pressure ratio impeller, but the manner of the optimization as described below is generally applicable to centrifugal impellers. The streamlines have been optimized to produce a closely matched rate of diffusion at blade root and tip and for production of an evenly increasing pressure ratio flow. These factors provide for an efficient flow.

Lines 52 represent the optimum air flow pattern at the tips of the impeller blades. The tip is that portion of the impeller blade farthest away from the impeller hub. Lines 54 represent the optimum air flow pattern at the root of the impeller blades. The air flow along the impeller is represented by these lines, and, since the flow is continuous around the circumference of the impeller, an infinite number of lines may be drawn.

Conventional impellers are not able to follow the optimum streamlines required to produce a most efficient flow. In modern conventional centrifugal impellers, each impeller blade constitutes an individual twisted sheet of metal that runs from the forward gas inlet end of the impeller to its aft end or gas exit. Blade 38 (FIG. 2) is generally radial, at least at the inlet, in that it is made to follow a radial line from the blade's center of rotation to the tip or outermost edge of the blade. In conventional centrifugal impellers, air tends to diffuser at a much higher rate near the impeller hub 27 than at the tip 31 of the blade in the inlet and central portions of the flow path.

Diffusion is defined as a decrease in fluid velocity and an increase in fluid pressure. The amount of diffusion done by an airfoil upon air is proportional to its velocity relative to that of the airstream and to its blade turning. Blade turning is the change in flow angle of the flow passage formed by two adjacent blades.

More diffusion occurs at the hub than at the tip of a radial impeller blade. The reason for this is that the speed of rotation of a rotating object increases from the center of rotation to its outermost point. Therefore, the blade tip 31 is at a higher velocity and centripetal acceleration than the blade root 29. The gas, therefore, travels at a higher velocity near the blade tip 31 than at the root hub 29 of a generally radial blade.

To compress a gas efficiently in a flow field, one needs to compress the gas at a relatively constant rate from blade root to blade tip as the gas passes through the compressor. It is inefficient to allow diffusion to occur at an inconstant rate as this tends to increase turbulence and decrease the effective pressure ratio of the compressor. Futhermore, a high rate of diffusion near the hub results in airflow stagnation and stall.

As shown in FIG. 5, the optimum aerodynamic profiles of impeller blade root and tip air flows differ if one attempts to maintain relatively equal rates of diffusion at the root and tip. The reason that the optimal profiles differ is because the airfoil forces applied by the blade differ. As states above, the absolute velocity of the blade tip is increased over the blade root as dictated by the radial length of the blade from the center of rotation. This is because in each individual rotation, the cirumference of the circle drawn out by the blade tip is larger than the circumference at the blade root. This difference in circumference decreases as the impeller becomes more centrifugally shaped. At the air outlet 44 there is no difference in circumference since the entire blade is at the same radius from the center of rotation. For most of the blade length, however, the blade tip travels a longer distance during each rotation, and therefore is travelling at a faster velocity than the blade root.

Figure 6:
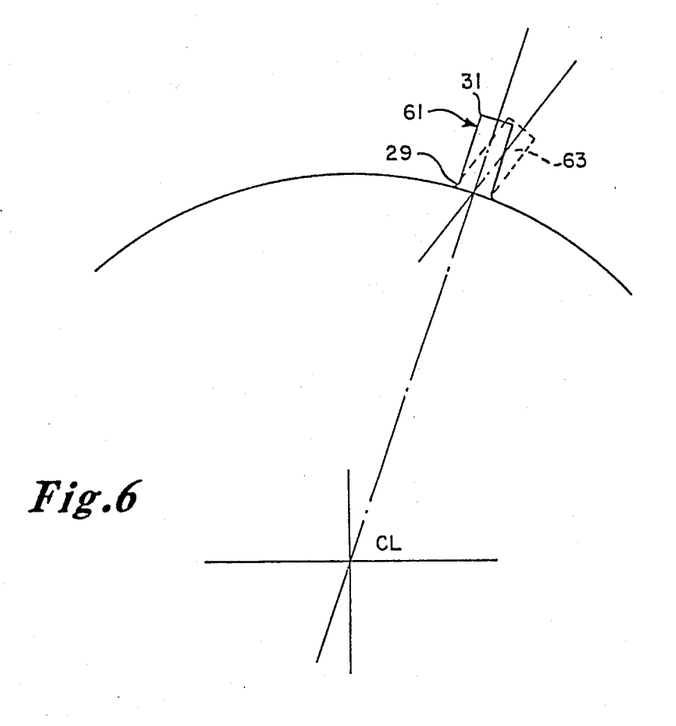
FIG. 6 is a cross sectional representation of a radial impeller blade and a non-radial impeller blade in phantom.

The blade 61 depicted in solid cross section in FIG. 6 is a radial blade. The tip 31 is found to be directly over the root 29 in a constant cross sectional plane. As a result, blade tip speed across the airstream is substantially greater than the blade root speed. It is evident that a radial blade, with a uniform blade angle, will not produce a uniformly pressurized flow during rotation because of the effects of the blade tip speed being elevated above the blade root speed.

In order to vary the work done upon a fluid independent of airfoil velocity, the blade angle, in respect to the fluid flow must be changed. As the blade angle in the flow changes, the amount of work done upon that flow is also changed. It has been deduced that, if the blade root is made to do less work upon the fluid flow than the work done by the tip, the effects of the higher tip speed may be offset and relatively equal rates of diffusion may be established both at the hub and at the tip.

Figure 7:
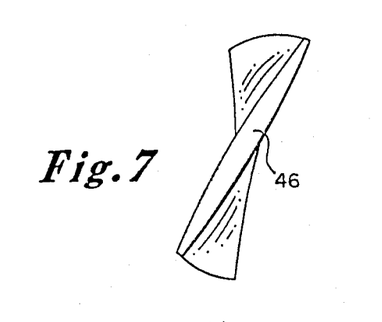
FIG. 7 is a plan view of a compressor blade designed as a twisted sheet.

Application of the principle of independent design of blade root and blade tip results in the manufacture of blades such as the blade shown in FIG. 7. This blade may be described as a twisted sheet. Such blades have multiple independent profiles resulting from a twisting of the blade tip relative to the blade root. The resulting blade has profiles which are changed continuously from the blade tip to the blade root. In this way, a continuous blade form is maintained. The result of this design characteristic is that the blade tip is positioned a distance away circumferentially from the blade root and is said to lean.

Therefore, in order to compensate for the difference in diffusion between the hub 27 and the blade tip 31, conventional impeller blades are designed to 'lean' from hub to tip off the radial line from the axis of rotation. Lean is defined as the amount that a blade tip diverges from a radial line drawn from the axis of rotation at a constant axial distance. This is shown by blade 63 in FIG. 6. Conventional impellers cannot, for reasons discussed below, utilize lean to its fullest potential in order to provide a more controlled rate of air diffusion from blade root to blade tip.

Figures 8, 9, 10:
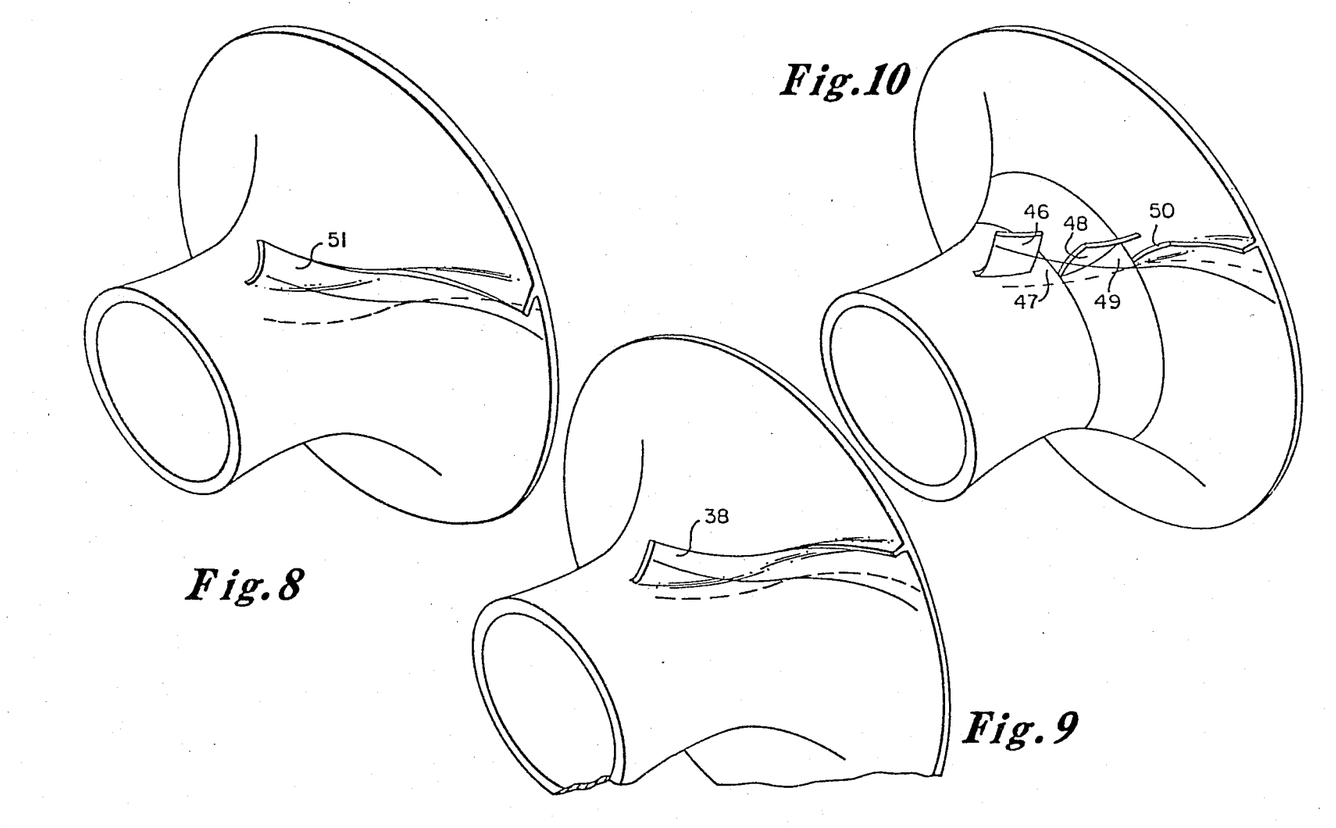
FIG. 8 is a perspective view of a singly highly leaned blade following optimal streamlines on an impeller hub.
FIG. 9 is a perspective view of a single conventional blade on an impeller hub.
FIG. 10 is a perspective view of a blade set incorporating this invention on an impeller hub.

Return now to FIG. 5 which displays optimum air stream profiles at the tip and root of a centrifugal impeller blade. Matching impeller blade angles to any pair of profiles from each of the groups of tip and root profiles produces a continuous impeller blade 51 with theoretically equalized diffusion for a more uniformly pressurized flow. At the inlet portion of the compressor, which is at the top of the figure, there is a large diversion in the angles of the root and tip streamlines. As a result of the streamline diversion, the inlet of blade 51, as can be seen in perspective in FIG. 8, shows a very large lean of the tip over the root. This lean decreases as the blade progresses along the airstream and the profiles cross. However, after crossing of the profiles, the lean begins increasing once more. Although the streamline profiles in the centrifugal portion of the impeller become very similar forms, the upstream air profiles require a large lean, which is carried through to the impeller exit. A blade like this could theoretically produce a controlled diffusion flow path. However, a blade formed in such a manner is nearly impossible to produce, and if produced, would be inefficient in actual usage and extremely fragile.

Figure 11:
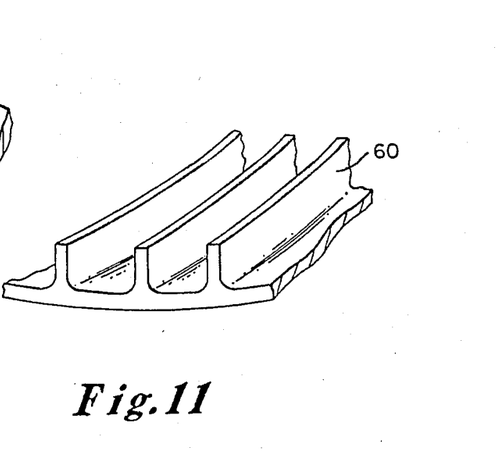
FIG. 11 is a perspective view of several radial impeller blades.
Figure 12:
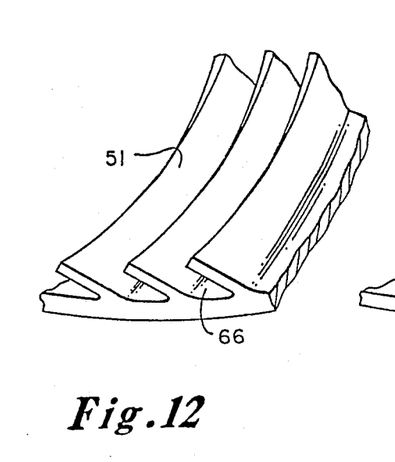
FIG. 12 is a perspective view of several highly leaned impeller blades.

To manufacture a highly polished continuous surface, as required for any thin aerodynamically sound airfoil, precise machining is required. In FIG. 12 can be seen partial sections of a series of several highly leaned blades 51 upon an unwrapped rotor hub. To machine the passage 66, it is difficult to get any sort of machine tool down to the base of the blade to properly form it without destroying the adjacent blade. The combination of blade lean and blade twist along the hub serves to make the underside of the blade roots inaccessible. This is not true with radial or nearly radial blades 60, as shown in the comparison FIG. 11. Tools may be more easily let down between the blades to machine the surfaces. This manufacturing difficulty has restricted blade lean to less than about 15°.

Manufacture would not, however, be the sole problem with the highly leaned blade 51 (FIGS. 5 and 8). In modern compressors, centrifugal impellers rotate at speeds up to 90,000 rpm and accept inlet air at supersonic relative velocities. FIG. 6 is a blown-up cross section of impeller blades at an impeller inlet. A fully radial blade 61 is shown in solid line. The center of the blade 61 follows a radial line from axis of rotation. A non-radial blade 63 can be seen in dotted lines with lean such as has been discussed. The leaning blade 63 is subject to centripetal acceleration which acts upon the blade to create a force which would tend to straighten that blade into a radial blade. This force is a major stress upon leaning rotating blades.

The centripetal acceleration produces a high stress in the leaned blade 63 at the root near the hub. In practice, the stress in centrifugal impeller blades restricts lean to less than about 12°–15°.

As an explanatory observation, a pencil spun on a string tends to remain straight out from the axis of rotation. Such would also be true of the blade tips of an impeller. Therefore, a radial blade such as 61 would have very little bending stress brought on the root; the blade would be in tension and would maintain the straight, outward rotational position. However, with a highly leaning blade 51, the forces acting on the blade would tend to straighten it, and therefore, at the hinge point which occurs at the root, the blade would be in bending as well as in tension. A leaned blade therefore has a higher maximum stress load than a radial blade rotating at the same speed.

A further disadvantage of large blade lean as in blade 51 is found only in modern transonic compressors as used for the most efficient aircraft gas turbines currently produced. In such compressors, airspeed near the impeller inlet is at supersonic velocities. The rotating blades are therefore subject to supersonic shock waves. These supersonic shocks in combination with blade lean greatly complicate efficient design of flow passages for supersonic relative velocities. Therefore, the large blade required in current impellers make efficient supersonic design very difficult.

As has been previously discussed, blade speed increases as one moves radially away from the center of rotation. The flow at the centrifugal exit, however, is completely different. Air flow is directed centrifugally outward from the axis of rotation. Therefore, both the blade tip and the blade hub are rotating at the same velocity since they are at the same radial distance from the axis of rotation. In order to produce efficient flow, blades at the centrifugal exit should be virtually perpendicular to the hub. Therefore, connecting the optimized air flow profiles for blade 51 with a continuous blade with reasonable lean at the inlet results in an inefficient exit 58. Such an exit would result in a greatly distorted and turbulent flow leaving the impeller exit. Air leaving the impeller exit leaves the centrifugal flow field created by the impeller and goes to a stationary diffuser. Turbulent exit air is very difficult for a diffuser to handle efficiently.

Returning now to FIGS. 5 and 8, it has been shown that the non-radial continuous blade 51, is inefficient. Such a blade could not easily be constructed, and if it were constructed, would be severely limited as to possible rotation speed because of bending stress.

Conventional impellers are therefore a compromise, as shown by conventional blade 38 in FIG. 9. Blades 38 does not follow the optimum profile at either the blade tip or root. Therefore, the rate of diffusion of the fluid will be somewhat uneven, both from the hub to the tip and axially along the length of the blade. This compromise allows for the construction of an adequate blade, with some lean and a proper centrifugal outlet. The flow pattern of the air leaving at the air exit has turbulence and secondary flow because of the uneven work done and a high rate of diffusion.

A further problem with conventional centrifugal impellers is that as the hub radius increases from inlet to exit, the blades diverge. This divergence results in wider air passages between the blades and greater air diffusion. The air not being effectively worked on by the blades tends to slow down, or diffuse, this decreased velocity results in greatly increased pressure. The pumping action of the compressor is made less efficient by a rapid increase in diffusion.

Conventional impellers have tried to limit this excess diffusion through the use of splitter blades 40, FIG. 2. Splitter blades 40 are foreshortened versions of the conventional continuous blades 38 that go from impeller inlet to exit. The splitter blades begin downstream of the inlet and end at the gas exit where the continuous blades end. Such foreshortened blades which work on the fluid in the channels between the continuous blades, allow for an increase in efficiency. However, since splitter blades must be directed in concordance with the continuous blades and are best placed in the middle of the flow passage formed by the continuous blades, design compromises are made which limit their efficiency. Specifically, splitter blades cannot be completely matched to the gas flow in order to entirely control excess diffusion.

An attribute of the conventional blade is, therefore, that air tends to diffuse too quickly near the hub. Although blade 38 is an improvement over a purely radial blade, it is still not as efficient in producing a uniformly pressurized flow as the theoretically possible continuous centrifugal blade. The conventional blade is a forced compromise due to the factors listed above. A conventional continuous blade, therefore, is limited to less than 15° lean which is insufficient to prevent excess diffusion at the hub.

To the right of FIG. 5, are three blades, 46, 48, and 50, which provide for a greatly improved airflow of high efficiency and follow more closely the optimum blade profiles. All three blades are machineable and mechanically stable as shown in perspective in FIG. 10.

An advantage of the invention is found in its use of several blades in place of the single centrifugal blade. The several blades allow for re-initialization of flow profile combinations along several portions of the airstream. This allows blade angle to be more efficiently matched to the optimum theoretical flow profiles.

The flow shown in FIG. 5 can be considered a continuous flow that can be divided into infinite streamlines. Therefore, by re-initializing the flow profile combination, one allows the blade angles to be matched to different streamlines in an optimum manner. A continuous blade is incapable of reinitializing flow profile combinations since it is relegated to following only one set of streamlines for the entire flowpath of the impeller.

The use of multiple blade rows allows for greater control of air flow, much as if a single continuous blade could be leaned beyond the 15° limit that has been discussed above. Effectively, a continuous blade following the same air flow characteristics would have much greater lean.

The first blade row, or inducer, 46 is a leaned blade row having mostly axial characteristics. In order to achieve high efficiency, two major design principles have been followed in addition to those generally used in designing a compressor blade row.

The inducer stage has been so designed as to follow the optimum streamlines shown in FIG. 5. The inducer blade row is thereby designed to produce a particular pressure ratio flow and to minimize the difference in the rates of diffusion at the blade tip and the blade root. This is done by following different blade angle profiles at the root and tip. By following the optimum streamlines, the impeller hub and blade root area have been unloaded aerodynamically in relation to the tip. If the hub was not unloaded relative to the tip, unwanted pressure rise and airflow stagnation inefficiencies would occur, because of the small flow area and the slow absolute velocity of the blade at the root. The rate of diffusion at the blade root and the blade tip is substantially equalized, that is, more nearly equal, if the inducer stage is designed according to the optimum streamlines. The axial length of the blade, however, has been foreshortened so that lean, which has been used to equalize the rate of diffusion, is restricted to within allowable geometric and aerodynamic limits.

In a further aid to efficiency, the air pressure leaving the blade row of the inducer 46 is equalized. This means that air pressure from impeller hub to shroud leaving the blade at its trailing edge is relatively constant.

The inducer stage, therefore, has been optimized for the inlet area of the impeller. Following the inducer stage, there is a short axial gap 47 (FIG. 10) where the airflow is not further compressed by the impeller. This axial gap allows the airflow to mix and makes possible the change in geometry of the following blade row. A transitional stage 48 is designed according to the optimum flow characteristics of the central portion of the impeller flow path.

The transitional stage 48 takes the flow from the more axial forward portion of the impeller to the more centrifugal area approaching the exit stage. This blade row 48 also follows the optimum streamlines shown in FIG. 5. The blade row is leaned radially to allow for a relatively constant, controlled rate of diffusion from blade root to blade tip. As with the inducer stage, the blade root follows a different blade angle profile than the blade tip, thereby allowing the blade to compensate for the difference in rotational speed between the root and the tip and the inefficiencies that would be caused by rotational effects. At the blade row exit, the air pressure is held relatively constant by this design.

The use of diverging blade angle profiles, or optimum streamlines, results in blade lean. As with the inducer stage blade, axial length is determined so as to restrict lean within tolerable limits. By following the above criteria, a much more efficient transitional region is created. In a continuous blade, the transitional region must be compromised to suit the aerodynamic and mechanical structure requirements of the air inlet 42 and exit 44.

As with the inducer blade row, there is a short axial gap 49 following the transitional row 48. This axial gap 49 makes possible the change in geometry of the exit row 50 and air flow mixing in between rows.

The constant pressure airflow that leaves the transitional stage, enters the exit stage 50, or exducer. As with the transitional stage, the exit stage can be wholly optimized for that area of the impeller. Since the airflow follows a centrifugal flow path for most of the length of the exit blades 50, an efficient exit allows the air to be centrifugally thrown outward from the impeller into the stationary diffuser. An efficient way of doing this is by having the blades placed perpendicular to the hub at the outlet. Since these blades at the exit are at the same radial distance from the center axis of rotation, any lack of perpendicularity is referred to as rake rather than lean to avoid confusion. What lean here occurs is described in the relationship of the blade's exit position to the upstream blade position. The lean limitation problems discussed above are less important in the exit blade row since, in relation to centripetal acceleration, the blade is firmly held along its side and is more resistant to bending loads. Therefore, stress is a less important factor in the exit blade row than in the preceding blade rows.

The exit blades 50 must still have some lean in order to follow the optimal flow profiles as shown in FIG. 5. As with the prior two blade rows, diffusion of the fluid is maintained at a controlled and relatively constant rate from blade root to blade tip. In addition, upon exiting the impeller, the fluid pressure is relatively constant throughout the exit area.

It is therefore shown that the lean at both the leading and trailing edges of the stages of the multi-bladed impeller is much reduced from that which would be required of the conventional impeller blade designed to achieve the same or similar controlled rate of diffusion across the blade height. The improvement thus shown allows for the optimization of blade flow profile with acceptable lean.

Efficiency requirements are thereby met in each of the three blade rows so that the flow produced by the multistage impeller is at a much higher level of efficiency than that of a conventional impeller. A continuous blade type impeller cannot cope with either the geometric or the aerodynamic problems in as efficient a manner.

There are, however, additional improvements that stem from use of the multistage impeller. Since there are three distinct blade rows, the number of blades in each blade row may be varied to match the volume of the flow area, the rotational speed, and the pressure ratio required of each stage. The separate blade rows may be adjusted circumferentially with respect to each other for maximum efficiency. Further, they may be manufactured so as to allow the leading edges of trailing blade rows to begin upstream of the preceding blade row's trailing edges.

In each blade row, the blades acting upon the fluid are matched to the flow area in which the blade row is also varied in order to produce a controlled rate of diffusion as the air passes through the impeller. The matching of both blade number and blade shape to optimum flow characteristics greatly aids efficiency. As discussed above, conventional blades cannot achieve as high a level of efficiency since the only change in blade number, or solidity, may be made by the addition of splitter blades which can only follow the compromise flow path of the continuous blades.

It must be additionally noted that all three blade rows are easily machineable. The impeller itself may be manufactured as a single piece or as multiple pieces to be assembled. A further advantage of this design approach is to allow different materials for the front and rear blade rows which can be machined separately and which can optimize the material selection for the stress and temperature levels of that location. In the preferred embodiment of the invention (FIG. 3), each blade row (46, 48, 50) is machined as a separate piece.

In summary, by allowing blade number to vary between blade rows and by individually optimizing the blade rows according to the different flow areas of the impeller, the inefficiencies that have previously plagued centrifugal impellers may be largely corrected. It has been shown that the aerodynamic and geometric constraints upon the conventional impeller are overcome through the use of the multiple blade row impeller shown.

Theoretical calculation and experimental results show that minimizing the rate of diffusion from blade tip to blade root and producing relatively constant pressures between each blade row as discussed above offer significant improvement in impeller efficiency. Depending on the pressure ratio required in the engine for which a centrifugal impeller is to be used, the number of blade rows on the centrifugally shaped hub may be varied. For smaller impellers only two rows may be necessary, while for larger impellers pumping a higher pressure ratio, more than three blade rows may in fact be required.

Described above is a centrifugal impeller which significantly increases the possible aerodynamic efficiency that may be achieved by centrifugal impellers. Centrifugal impellers embodying this invention may now be more universally used in gas turbine engines.

Centrifugal impellers of the type embodying this invention may be used as highly efficient final compression stages in virtually any gas turbine application and allow for reduction in total engine length by elimination of axial stages and their accompanying stator portions. This allows for a significant reduction in weight in gas turbine engines and a concurrent increase in the thrust per weight ratio of said engines. Such increases result in increased efficiency and decreased fuel consumption.

While the invention has been particularly shown and described with reference to the preferred embodiments thereof, it will be understood by those skilled in the art that various changes in form and detail may be made therein without departing from the spirit and scope of the invention as defined by the appended claims. The text of the application has described a design procedure which has been followed by the inventors and is thought superior to previous design procedures both in its method of use and the product of its application. Various simlar centrifugal impellers for both gas turbine and non-gas turbine uses may be designed and constructed embodying the invention disclosed.

What is claimed:

1. A method of compressing a fluid flow and transforming said fluid flow from an axial to a centrifugal flow in a centrifugal compressor, which comprises the steps of:
    (a) compressing the fluid in an optimized axial manner at a first blade row including blades each having a root and a tip, and
    (b) further compressing the fluid in an exit blade row with an optimized centrifugal exit, said exit blade row including blades each having a root and a tip,
    (c) the fluid flow being diffused at a substantially equalized rate along blade height from said roots to said tips of said blades of both said first and exit blade rows as the fluid proceeds from said first blade row and through said exit blade row.

2. A method of compressing a fluid flow as claimed in claim 1 further characterized by:
    uniformly pressurizing the fluid flow field at each blade row exit.

3. A method of compressing a fluid flow as claimed in claim 1 further comprising the steps of:
    varying blade number from blade row to blade row in order to reduce fluid rates of diffusion in the compressor from inlet to exit.

4. A method of compressing a fluid flow in a unitary centrifugal compressor and transforming the fluid flow from an axial to a centrifugal flow, which comprises the steps of:
    (a) compressing the fluid in an optimized axial manner at an intake blade row including blades each having a root and a tip,
    (b) further compressing the fluid in a transitional to centrifugal manner at a central blade row including blades each having a root and a tip, and
    (c) further compressing the fluid in an optimized centrifugal blade row including blades each having a root and a tip, the fluid flow being diffused at a reduced rate as the fluid proceeds through the annular compression section by the means of variation of blade number in said blade rows,
    (d) the fluid flow being diffused at a substantially equalized rate along blade height from said roots to said tips of said blades of said intake, central and centrifugal blade rows as the fluid proceeds from said intake blade row and through said centrifugal blade row.

5. A method of compressing a fluid flow as claimed in claim 4 further characterized by:
    pressurizing the fluid in a substantially constant manner at blade row exits.

6. A method of compressing a fluid flow as claimed in claim 4 further characterized by:
    reducing blade lean through periodic re-initialization of optimum blade angle profiles.

7. A method of compressing a gas in a centrifugal compressor comprising the steps of:
    (a) compressing said gas in a substantially axial direction through an inducer blade row including blades each having a root and a tip and blade twist angle profiles;
    (b) further compressing said axially compressed gas in a substantially radially outward direction through an exducer blade row including blades each having a root and a tip and blade twist angle profiles; and
    (c) matching said blade twist angle profiles of both said inducer and said exducer blade rows with different, substantially optimum gas stream lines at both said roots and said tips of said blades.

8. A method of compressing a gas in a centrifugal compressor according to claim 7 wherein said gas is compressed so as to produce a generally constant gas pressure flow from said roots to said tips at exits of both said inducer and said exducer blade rows.

9. A method of compressing a gas in a centrifugal compressor according to claim 7 wherein said gas is compressed so as to produce a substantially equalized rate of diffusion from said roots to said tips of both said inducer and said exducer blade rows.

10. A method of compressing a gas in a centrifugal compressor according to claim 7 wherein said blade twist angle profiles of said exducer blade rows are matched to different optimum gas stream lines than those of said inducer blade row to reinitialize gas flow.

11. A method of compressing a gas in a centrifugal compressor according to claim 7 further including the step of further compressing said axially compressed gas in a transitional blade row, including blades each having a root and a tip and blade twist angle profiles, prior to being compressed in said exducer blade row.

12. A method of compressing a gas in a centrifugal compressor according to claim 7 wherein said blades of said inducer and said exducer blade rows are twisted for obtaining blade lean.

13. A method of compressing a gas in a centrifugal compressor comprising the steps of:
  (a) compressing said gas in a substantially axial direction through an inducer blade row including blades each having a root and a tip and blade twist angle profiles;
  (b) further compressing said axially compressed gas in a transitional blade row, including blades each having a root and a tip and blade twist angle profiles, and channeling said gas from a generally axial direction to a generally radially outward direction;
  (c) further compressing said compressed gas from said transitional blade row in a substantially radially outward direction through an exducer blade row including blades each having a root and a tip and blade twist angle profiles;
  (d) matching said blade twist angle profiles of said inducer, transitional and exducer blade rows with different, substantially optimum gas stream lines at both said roots and said tips of said blades; and
  (e) twisting said blades of said inducer, transitional, and exducer blade rows for obtaining blade lean.

14. A method of compressing a gas in a centrifugal compressor according to claim 13 wherein said gas is compressed so as to produce a generally constant gas pressure flow from said roots to said tips at exits of said inducer, transitional and exducer blade rows.

15. A method of compressing a gas in a centrifugal compressor according to claim 13 wherein said gas is compressed so as to produce a substantially equalized rate of diffusion from said roots to said tips of said inducer, transitional, and exducer blade rows.

16. A method of compressing a gas in a centrifugal compressor according to claim 13 wherein said blade twist angle profiles of each of said inducer, transitional, and exducer blade rows are matched to different optimum gas stream lines to reinitialize gas flow.

17. A method of compressing a gas in a centrifugal compressor according to claim 13 wherein said inducer, transitional, and exducer blades have blade lean from roots to tips thereof of less than about 15°.

* * * * *